June 2, 1953
J. F. GARRETT
2,640,635
WATERBAG CARRIER
Filed Nov. 4, 1950
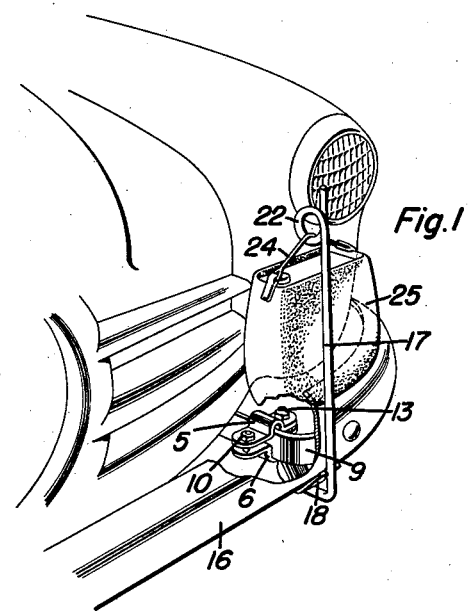
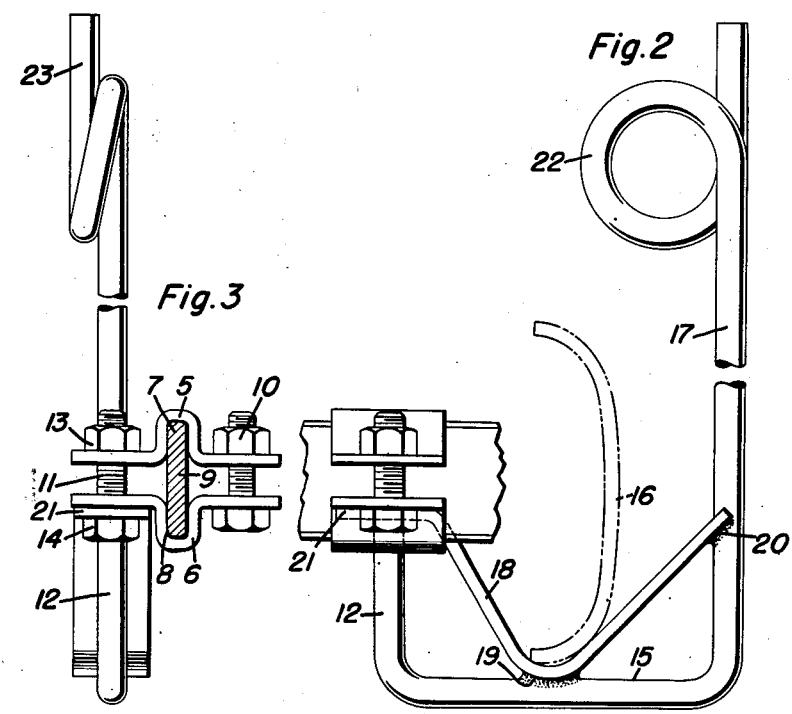
James F. Garrett, INVENTOR.

Patented June 2, 1953

2,640,635

UNITED STATES PATENT OFFICE 2,640,635

WATERBAG CARRIER

James F. Garrett, Pampa, Tex., assignor of one-half to Harry R. Garrett, Pampa, Tex.

Application November 14, 1950, Serial No. 195,674

2 Claims. (Cl. 224—42.03)

The present invention relates to new and useful improvements in water bag carriers for automobiles.

An important object of the invention is to provide a water bag carrier having means for clamping to the bumper support of an automobile and including an upwardly extending water bag supporting rod having means at its upper end for easily and quickly attaching the carrying strap or handle of a water bag thereto.

Another object of the invention is to provide attaching means for the upstanding water bag support and which includes a clamping device adapted for attaching to a vehicle bumper support and a V-shaped saddle positioned under the lower edge of the bumper and which serves to hold and brace the upstanding support in front of the bumper to avoid marring or scratching the finish thereof.

A still further object is to provide a device of this character of simple and practical construction, which is strong and durable, neat and attractive in appearance, relatively inexpensive to manufacture and otherwise well adapted to the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view with part broken away and showing section;

Figure 2 is an enlarged side elevational view; and,

Figure 3 is an enlarged front elevational view.

Referring now to the drawings in detail wherein for the purpose of illustration is disclosed a preferred embodiment of my invention the numerals 5 and 6 designate a pair of upper and lower clamping plates having opposed grooves 7 and 8 at their central portions in which the upper and lower edges of a bumper support 9 are engaged.

One end of the plates 5 and 6 are connected to each other by a bolt and nut 10 while the other end of the clamping plates are connected to each other by the threaded end 11 of a rod 12 which extends through the upper and lower plates and secured thereto by upper and lower nuts 13 and 14.

The rod 12 extends downwardly from its threaded end 11 in substantially U-shape as shown at 15 for extending under the bumper 16 of an automobile and upwardly in front thereof to form an upstanding support 17.

A V-shaped saddle 18 is welded at its lower portion to the central portion of the U-shaped structure 15, as shown at 19 and one end of the saddle 18 is also welded to the lower portion of support 17 as indicated at 20. The other end portion of the saddle 18 is formed with a horizontal flange 21 through which the threaded end 11 of rod 12 extends and is secured against the under side of lower clamping plate 6 by the lower nut 14.

The upper end of the support 17 is coiled to form an eye 22 with a resilient free end 23 extending upwardly from the eye to receive the carrying strap or handle 24 of a water bag 25 for attaching to the eye to support the water bag thereon.

The clamping plates 5 and 6 are secured in position to the bumper support 9 so that the saddle 18 will underlie the bumper 16 and with the bumper centered in the saddle to hold the upstanding support 17 away from the bumper and in front thereof to thus avoid marring or scratching of the bumper.

The upstanding support 17 may then support a water bag 25 in front of the grill of the automobile and out of contact therewith.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A water bag carrier for vehicles comprising a pair of clamping plates adapted for attaching to a part of a vehicle adjacent its bumper, an upstanding support having an angular lower end positioned under the bumper and formed with a threaded upstanding stud connecting the clamping plates to each other in clamping engagement to the vehicle and a V-shaped saddle supported by the angular lower end of the support under the bumper.

2. A water bag carrier for vehicles comprising a pair of clamping plates adapted for attaching to a part of a vehicle adjacent its bumper, an upstanding support having an angular lower end positioned under the bumper and formed with a threaded upstanding stud connecting the clamping plates to each other in clamping engagement to the vehicle, and a V-shaped saddle attached to the angular lower end of the support and positioned transversely under the bumper.

JAMES F. GARRETT.

References Cited in the file of this patent

UNITED STATES PATENTS

| Number | Name | Date |
|---|---|---|
| 2,432,732 | Del Cano | Dec. 16, 1947 |
| 2,512,267 | Donnelley | June 20, 1950 |
| 2,521,221 | Ivey | Sept. 5, 1950 |
| 2,592,050 | McCharen | Apr. 8, 1952 |

FOREIGN PATENTS

| Number | Country | Date |
|---|---|---|
| 93,243 | Sweden | Nov. 11, 1938 |
| 258,744 | Switzerland | May 16, 1949 |
| 625,461 | Great Britain | June 28, 1949 |